May 19, 1925.  
F. O'NEILL  
PLUNGER GATHERING OF GLASS  
Filed June 24, 1921  
1,537,962  
4 Sheets-Sheet 2
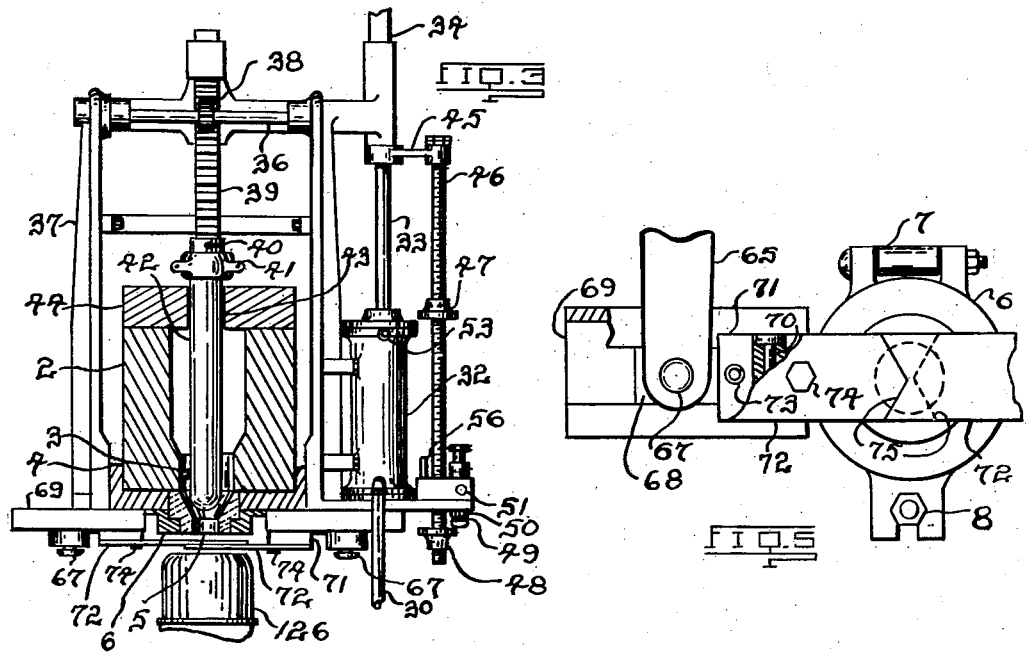
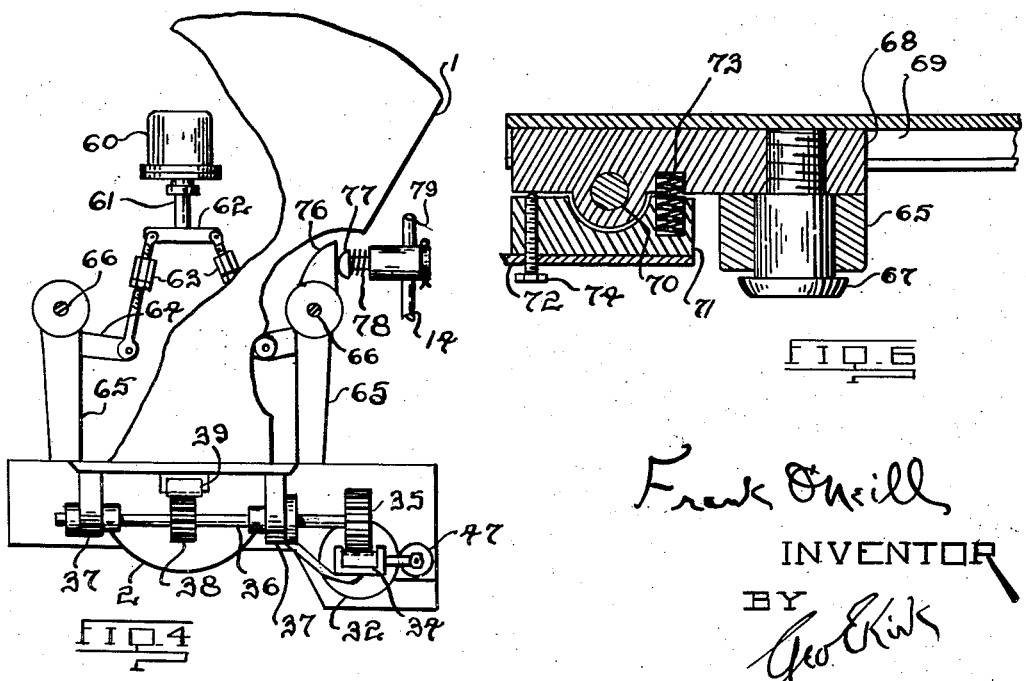
Frank O'Neill
INVENTOR
BY Geo. E. Kirk
ATTORNEY

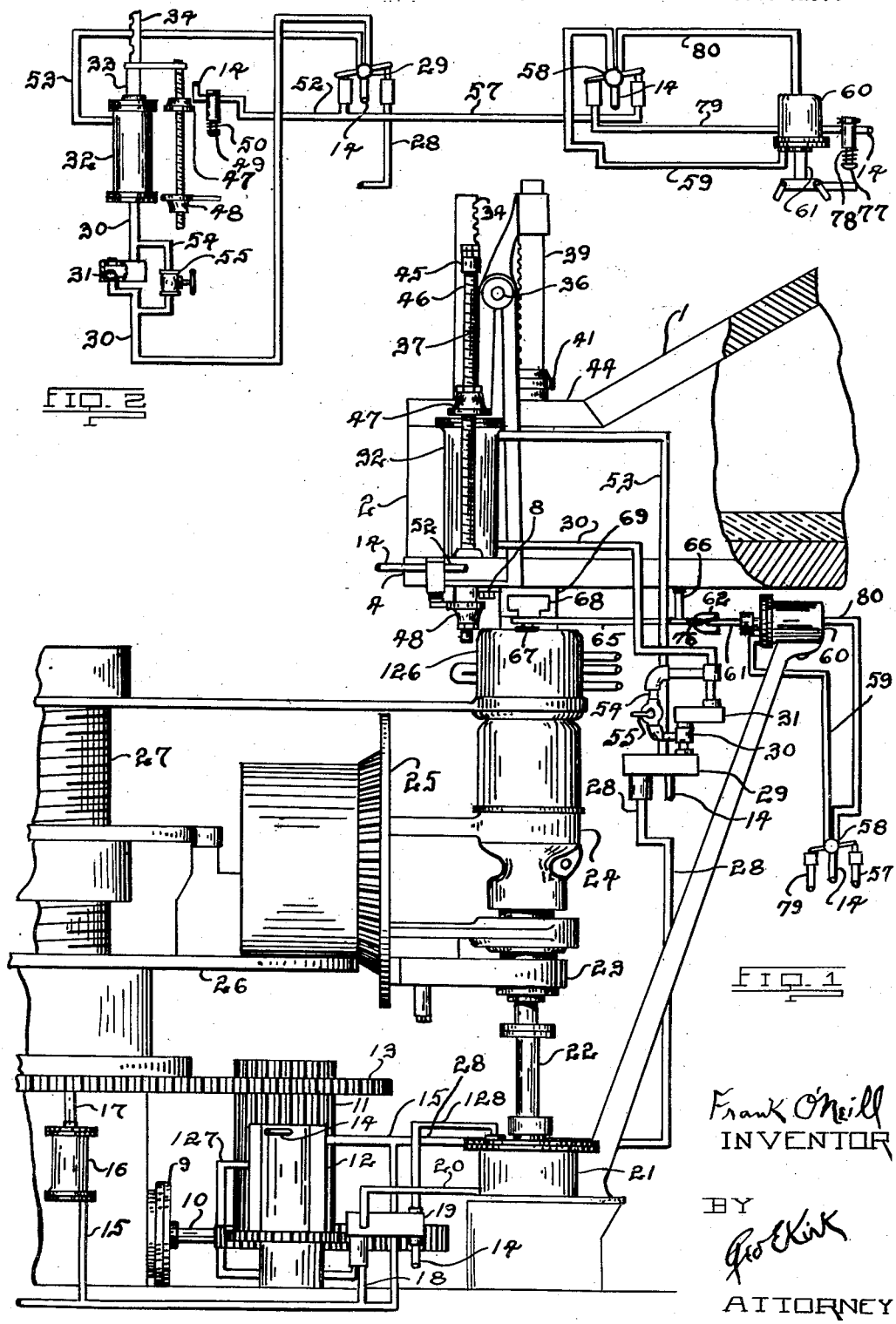

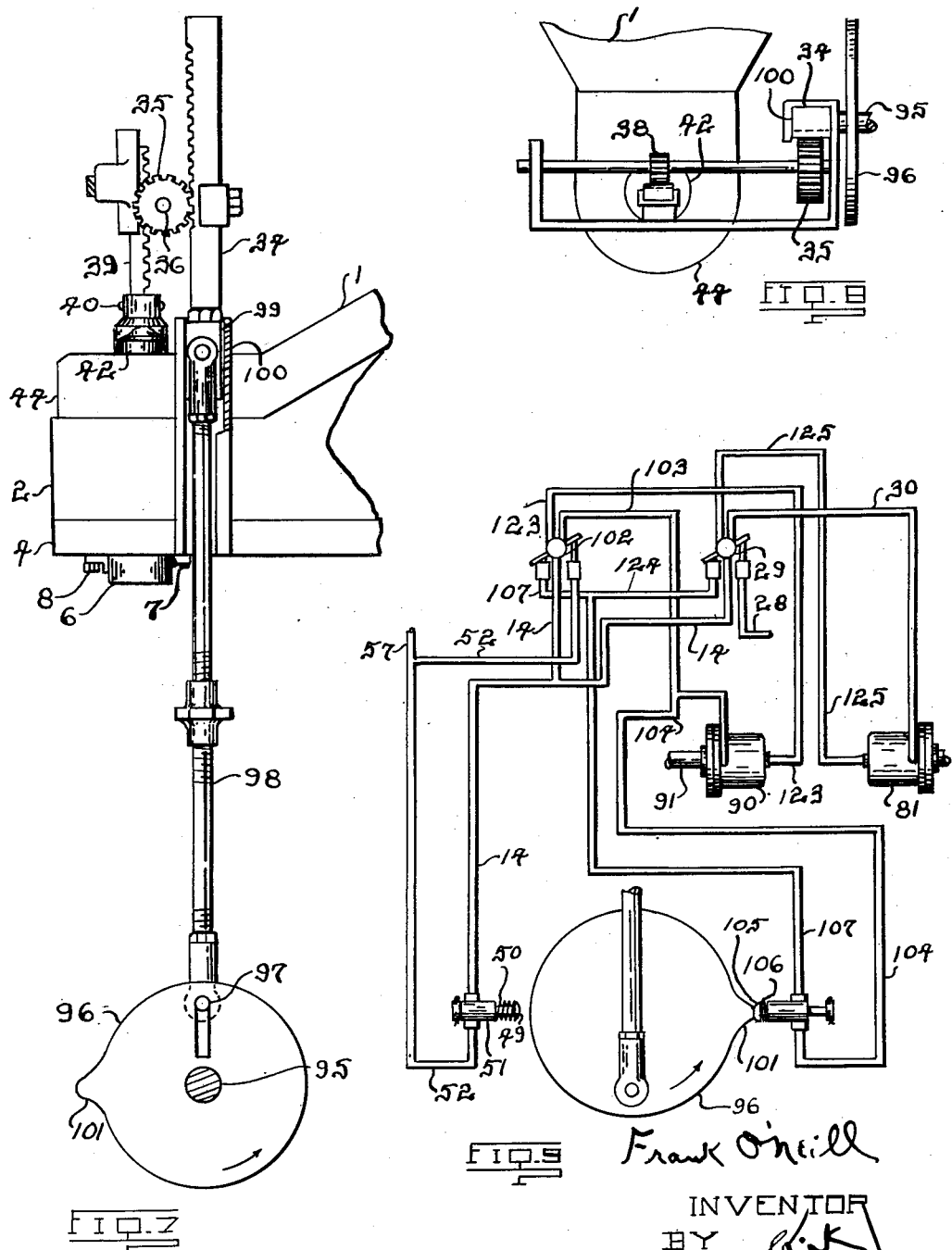

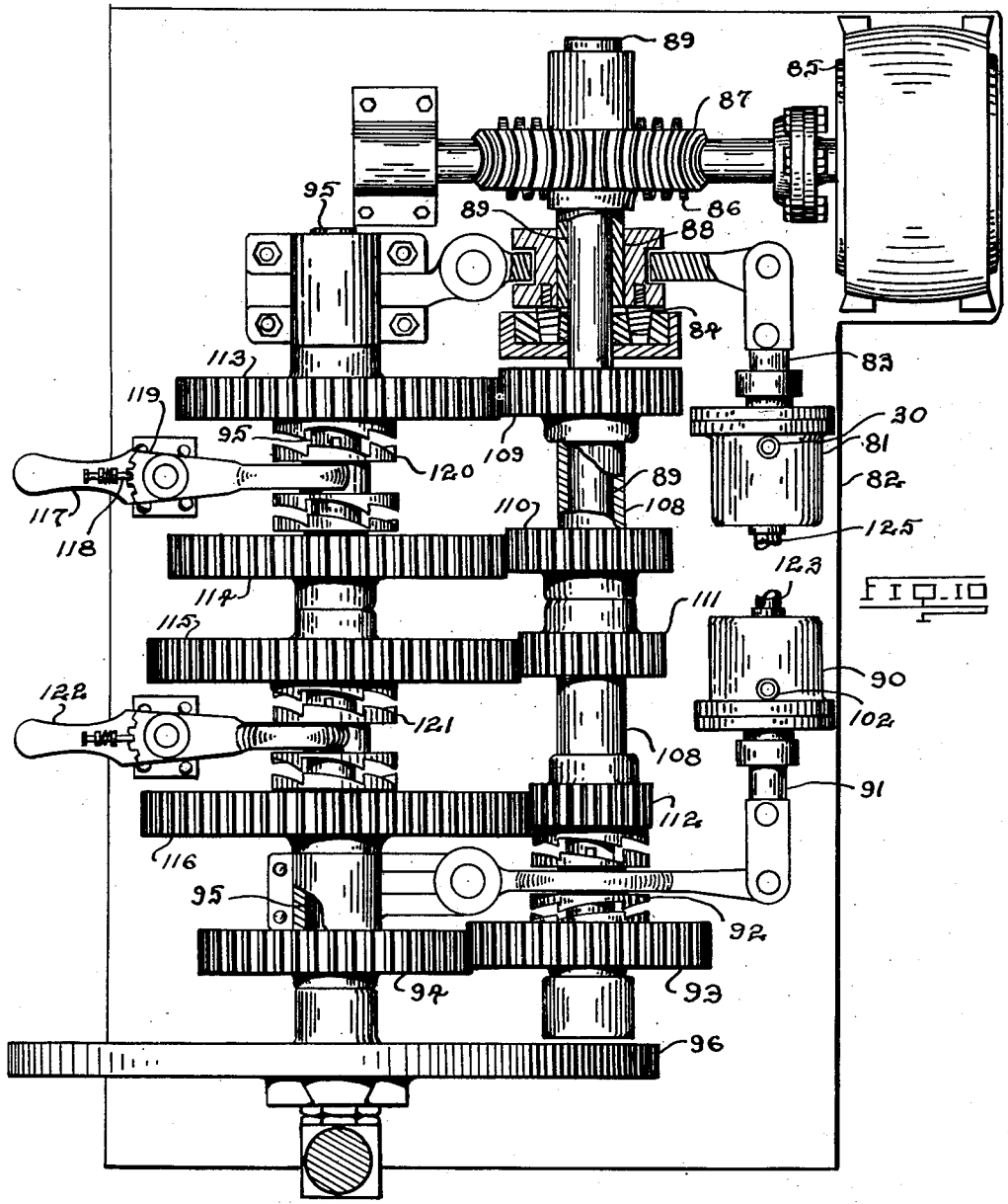

Patented May 19, 1925.

1,537,962

UNITED STATES PATENT OFFICE.

FRANK O'NEILL, OF TOLEDO, OHIO, ASSIGNOR TO THE O'NEILL ENGINEERING COMPANY, OF TOLEDO, OHIO, A CORPORATION OF OHIO.

PLUNGER GATHERING OF GLASS.

Application filed June 24, 1921. Serial No. 480,198.

*To all whom it may concern:*

Be it known that I, FRANK O'NEILL, a citizen of the United States of America, residing at Toledo, Lucas County, Ohio, have invented new and useful Plunger Gathering of Glass, of which the following is a specification.

This invention relates to gather mechanisms for high rate of operation in connection with glassware forming machines.

This invention has utility when operated in synchronism with bottle-making machines.

Referring to the drawings:

Fig. 1 is a fragmentary side elevation of a glass bottle forming machine showing the device of this invention incorporated between this machine and a molten glass supply;

Fig. 2 is a piping diagram for the control connections for the air operation of the device as incorporated in Fig. 1;

Fig. 3 is a detail view, partly in section, on an enlarged scale of the gather device of this invention in its association with a pool or supply of glass;

Fig. 4 is a plan view of features of the device of Fig. 3;

Fig. 5 is a bottom plan of the shear and features of the coacting mechanisms, partly broken away;

Fig. 6 is an enlarged section of the shear mounting, parts being broken away;

Fig. 7 is a detail view, in side elevation, of an operating device for the gather of this invention;

Fig. 8 is a plan view of the plunger drive as driven by the mechanism of Fig. 7;

Fig. 9 is a control diagram for the power connections of Fig. 7; and

Fig. 10 is a plan view of the variable speed drive control for the device as disclosed in Fig. 7.

A furnace 1 for molten glass supply is provided with an extension 2, in the bottom of which, away from the furnace 1, there is disposed an orifice 3. This extension 2 is housed adjacent the orifice 3 by a frame 4. Concentric with this orifice 3 is a throat 5 of refractory material, which may be held in position by a collar 6, readily shiftable upon a hinge 7 when released by a bolt 8.

A cylinder 9 is the main drive for the bottle-making machine and has its rack piston rod 10 coacting with intermediate gear 11 for driving the glass-bottle making machine on one side, while it coacts with a gear on a main control valve 12 for rotating said valve on the other side. The intermediate gear 11 directly drives the gear for rotating the blank mold table gear 13.

A source of power air is brought to the main control valve 12 by line 14 and as the limit of driving stroke is reached by the piston rod 10, the control valve 12 permits the flow of power air by way of line 15 to cylinder 16 for throwing plunger 17 into holding position as to the table 13. Branch 18 from this line 15 rocks valve 19 to permit flow of power air by way of line 20 to a cylinder 21 for lifting piston 22 to neck finish 23 closing the lower end of blank mold 24. This blank mold 24 at the charging or gather receiving station is mounted on disk 25 carried above table 26 mounted to rotate on column 27 with the gear 13.

From the air line 15 is another branch 28 to a valve 29 permitting flow of power air from the line 14 by way of line 30, to open check valve 31 for in-flow of power air to the vertical cylinder 32, thereby lifting piston rod 33 therefrom and by means of rack 34 (Fig. 4) in mesh with gear 35, rotating shaft 36 carried in upright 37 from frame 4 of the overhang or tank extension 2. This horizontal shaft 36 over the extension 2 has remote from the driving gear 35 a driven pinion 38 in mesh with rack 39 connected by pin 40 with clamp 41 mounting therewith a refractory cylindrical extension or plunger 42 protruding through opening 43 in housing top 44 of the extension 2. This opening 43 in the housing top 44 aligns this plunger 42 with outlet 3 and concentric throat 5.

This piston rod 33 carries bracket 45 for suspending threaded stem 46 having upper stop and lower stop 47 and 48 respectively. These stops 47, 48, are adjustable along this threaded stem 46 to desired positions. During the upward travel of the stem 43 for throwing downward the plunger 42, the adjustable stop 48 is lifted so that when the desired limit of travel is reached, the stop 48 comes in contact with valve plunger head 49, normally thrust downward by helical spring 50. This thrusting upward of the valve 49 brings port 51 into register for flow of power supply air from power air supply line 14, to flow by way of line 52 for resetting the valve 29. This means a cutting off of air from the lower side of the cylinder 32 and simultaneous supply of air, by way of line 53, from the valve 29 to the upper side of the cylinder 32. The exhaust or leakage from the lower side of the cylinder 32 may not get by the check valve 31, but is by-passed by way of line 54 through adjustable stop-cock 55, thence by line 30 back to exhaust through the rocker valve 29. Accordingly as the stop-cock 55 is adjusted, the downward travel of the piston rod 33 may be regulated and this regulation for a slow recover travel, means that in this downward travel of the piston 33, the plunger 42 may have its travel upward regulated in retarded travel, while its travel downward may be at high speed of operation as the piston 33 moves upward. In practice it is desired to have this withdrawal action of the plunger 42 such that the flow of glass from the pool in the extension 2 may not be one that will disturb the gather exuding volume. In other words, this regulation of the upward travel of the plunger 42 may coact for regulating the volume or measuring the size of the gather so that no other means is necessary at the orifice 3 for preventing leakage or other controlling of the flow of molten glass from the pool.

At the limit of the upward travel of the plunger 42 as adjusted, the stop 47 will limit the downward travel of this plunger as desired, the stop coming in contact with the abutment 56.

Simultaneous with this withdrawal of the plunger 42, the depending portion of molten glass is sheared off as a section or gather. To this end, there is from the power air line 52, branch 57 extending to rock valve 58 so that power air from line 14 may flow by way of line 59 to the inner end of shear cylinder 60 to thrust piston 61 thereinto. This piston 61 carries cross-head 62 extending to adjustable link 63 connected to short arm 64 of angle lever 65 fixedly pivoted on fulcrum 66. These angle levers 64, 65, are for throwing the shear. The arms 65 are each connected by a pin 67 with a block 68 reciprocable toward each other in guide 69. Each block 68 has hinge pin 70 for auxiliary block 71 carrying a blade 72 having a notch terminus. This block 71 is normally urged to have its free end toward the orifice and urged in toward the orifice by a spring 73. The adjustment of this blade 72 as to the throat 5 of the orifice 3 is regulated by a set screw 74. Accordingly each of the shear blades may have their positions relatively to the throat of the orifice 3, 5, adjusted into such desired proximity with the collar 6 as may be found acceptable in practice.

As the severing notches 75 of the shear blades 72 complete their action, the inward travel of the piston rod 61 is such that extension 76 of one of these angles levers of the shears contacts with head 77 and against the action of spring 78 effects the opening of the valve for flow of power air by way of line 79 from line 14 to reset this rocker valve 58.

In Figs. 8, 9, 10, instead of the pneumatic power drive, there is shown an electric power drive. For this control, there are pneumatic connections and the line 28 to rocker valve 29 has the power air supply therefrom to line 30 extending to a cylinder 81 on frame platform 82. This power supply to cylinder 81 draws piston rod 83 thereinto and there is throwing in of clutch 84. Motor 85 to worm 86 has worm wheel 87 for continuously driving sleeve 88 on a shaft 89. This sleeve 88 is connected up by this clutch 84 to drive the shaft 89. At this period of starting, cylinder 90 has its piston rod 91 thrown outward so that the jaw clutch 92, splined on the shaft 88, is in engagement to drive gear 93 from the shaft 89. This means that the gear 93 in mesh with a gear 94 on shaft 95 is effective for driving crank disk 96. This crank disk 96 on the shaft 95 carries adjustable wrist pin 97 connected to adjustable length link 98 extending to cross-head 99, reciprocable in guide 100. To this cross-head 99 is connected rack 34 in mesh with the gear 35 thereby coacting for reciprocation with the rack 39 in controlling the plunger 42. The operation is upward movement of the cross-head for downwardly driving the plunger 42.

This driving travel of crank-disk 96 is counter-clock wise from the position show in Fig. 7. In 180° travel, lug 101 comes into contact engagement with plunger 49 against the action of the spring 50 thereby bringing port 51 to position for a flow of power air from line 14 by way of line 52. This line 52 extends to rocker valve 102 thereby permitting flow of power air by way of line 103 to cylinder 90, thereby drawing piston 91 into such cylinder and unclutching the gear 93 so that the shaft 95 is not in direct driving engagement by way of gears 93, 94, to actuate the crank disk 96 in further rotation beyond this first 180° of the upward travel of the connecting rod 98 effecting the downward travel of the plunger 42. This power air line 103 to the cylinder 90 has branch 104 to valve having plunger 105 normally thrown by spring 106 to have its port out of register, so that there may not be flow of air by way of line 104 to line 107 and thence to rocker valve 102 (Fig. 9).

Loosely mounted on the shaft 89 is sleeve 108 carrying (Fig. 10) gears 109, 110, 111, 112, of different sizes respectively in mesh with the gears 113, 114, 115, 116, loosely mounted on the shaft 95, parallel to the shaft 89. Manually operable control handle 117 may have its detent 118 thrown into mesh with the desired tooth of segment 119 thereby holding one way jaw clutch member 120 splined on the shaft 95 into engagement with gear 111 or 112 as may be selected. A jaw clutch 121 similar to the clutch 117 may coact as to gears 115 or 116 upon operation of control handle 122. These clutches 120 and 121 are one way drive and in the operation of the device it is desirable that one thereof only be thrown in. However, should by accident, both be thrown in, the higher speed drive will be the one which will control because of the one way drive type of clutch allowing the slower drive to slip. In usual operation, one of these handles 117, 122, is thrown in. Assuming the handle 117 clutches the gear 113 to the shaft 95, when the high speed driving action is thrown out by unclutching the clutch 92 from the gear 93, this clutch 92 is thereby clutched to the gear 112 to drive the sleeve 108, then all the gears 109, 110, 111, 112, drive respectively the gears 113, 114, 115, 116. As the gear 113 is clutched to the shaft 95, the shaft 95 is thereby rotated for the slower speed. The drive through the gears 93, 94, being cut out, then the next speed will take hold and the drive will be through the selected gear of the slow speed drive in the next 180° operation of the disk 96 for the travel of the connecting rod 98 downward as the plunger 42 travels upward.

When the second 180° stroke of the connecting rod 98 is completed the extension or lug 101 on the disk 96 will allow flow of power air from branch 104 of line 103 by way of valve 105 as opened against the resistance of spring 106, thence by line 107 to rocker valve 102 thereby allowing flow of power air by way of line 123 to the cylinder 90 to reset the clutch 92 to driving relation with the gear 93. Simultaneously by way of line 124 from the line 107 valve 29 is reset so that the air from line 14 may flow by way of line 125 to the cylinder 81 and shift the clutch 84 to disconnect the shaft 89 from being driven by the motor 85.

The slug of glass from the shear 72 is guided by temperature controlled funnel 126 into the open bottom of an inverted blank mold 24. Before the table 26 is released, air from valve 12 at the idle limit stroke of the piston rod 10, passes by line 127 to rock the valve 29. This allows power air from the line 14 to flow by line 128 to move the plunger 22 down so that the blank is released from the table 26 to shift in bringing another blank mold into position.

The operation of the plunger 22 is accordingly in direct co-operation with the shear blades 72 for the direct purpose of producing a definite and compact gather of molten glass, from a continuous body through a way toward the shear from the pool. As the shear severs a gather, the plunger moves upward in the molten material stream, thereby, not only checking the glass flow, but in reality pulling the stream upward away from the shear, so as the severed gather falls away from below the shear, the stream flow above is drawn back for full clearance of the shear. The succeeding gather is thereby not chilled at the shear, and furthermore the stream from the severed end back up into the pool through the way is continuous. The plunger has not come into contact with the walls of the way to interrupt the stream, but the plunger in its downward travel has urged forward a stream section toward the shear and therethrough at such a rate that there has not been a lengthening out of the free end of the stream, but a compact mass for the gather. As the plunger has not interrupted the stream continuity there is no chill which may disturb the uniformity of a succeeding gather for even blow forming into hollow ware. The accelerating and checking of the gravity stream is due to the movements of the plunger as enveloped by such stream.

What is claimed and it is desired to secure by Letters Patent is:

1. A glass feeder plunger provided with a stem having a rack, a rock shaft having a pinion in mesh with said rack, and piston and cylinder actuating means for the shaft.

2. A glass feeder plunger drive embodying a rock shaft having two pinions, a piston and cylinder actuator for one of the pinions, and a plunger stem driven from the other pinion.

3. A glass feeder plunger drive embodying a rock shaft, a small follower pinion and a larger actuator pinion on said shaft, a piston rod provided with a rack in mesh with the larger pinion, and a plunger stem having a rack in mesh with the smaller pinion.

4. A glass feeding plunger for exuding glass from a pool, and a shear for severing emerging glass, said shear embodying a pair of blades, bearings on which said blades are swingable toward each other, one of said blades having an additional transverse bearing, a stop for said latter blade adjacent said transverse bearing, and a spring yieldably holding said latter blade against said stop.

5. A glass shear embodying a pair of aligned fixed guides, oppositely reciprocable members movable in said guides, a blade carried by each member notched at its terminus toward the other member, and yieldable means coacting between the blades and members for holding the blades against each other as they are moved into overlapping relation by said members.

In witness whereof I affix my signature.

FRANK O'NEILL.